(12) United States Patent
Plötz

(10) Patent No.: US 7,065,844 B2
(45) Date of Patent: Jun. 27, 2006

(54) AIRBAG COVER

(75) Inventor: Kurt Plötz, Waldems (DE)

(73) Assignee: Johns Manville, Denver, CO (US)

( * ) Notice: Subject to any disclaimer, the term of this patent is extended or adjusted under 35 U.S.C. 154(b) by 431 days.

(21) Appl. No.: 10/699,213

(22) Filed: Oct. 31, 2003

(65) Prior Publication Data

US 2004/0128810 A1 Jul. 8, 2004

(51) Int. Cl.
*D04H 1/48* (2006.01)

(52) U.S. Cl. .......................................... 28/112; 26/18.5

(58) Field of Classification Search ................. 28/100, 28/103, 104, 106–114, 116, 122, 123, 134, 28/140, 142, 143, 165; 26/18.5, 18.6, 1; 428/34.9, 35.2, 35.5, 36.1, 43; 442/402, 442/409; 280/728.1, 729, 743.1; 156/62.6, 156/148, 166, 250, 209, 269, 180, 181, 196; 264/119, 175, 284
See application file for complete search history.

(56) References Cited

U.S. PATENT DOCUMENTS

| | | | | |
|---|---|---|---|---|
| 4,117,578 A | * | 10/1978 | Forsten | 28/112 |
| 4,435,458 A | * | 3/1984 | Hill | 428/91 |
| 4,774,110 A | * | 9/1988 | Murakami et al. | 427/365 |
| 4,814,219 A | * | 3/1989 | Burgess et al. | 428/113 |
| 4,916,782 A | * | 4/1990 | Caldwell | 28/111 |
| 4,935,295 A | * | 6/1990 | Serafini | 442/383 |
| 5,566,434 A | * | 10/1996 | Beasley | 28/112 |
| 5,692,777 A | * | 12/1997 | Tochacek et al. | 280/743.1 |
| 5,879,487 A | * | 3/1999 | Ravella | 156/62.8 |
| 5,970,583 A | * | 10/1999 | Groten et al. | 19/296 |
| 6,473,948 B1 | * | 11/2002 | Keshavaraj et al. | 26/18.6 |
| 6,750,166 B1 | * | 6/2004 | Etzold et al. | 442/329 |
| 2003/0114070 A1 | * | 6/2003 | Raponi et al. | 442/402 |

FOREIGN PATENT DOCUMENTS

| | | |
|---|---|---|
| EP | 1213194 A2 * | 12/2001 |
| WO | WO 01/64478 A2 * | 9/2001 |

* cited by examiner

*Primary Examiner*—A. Vanatta
(74) *Attorney, Agent, or Firm*—Robert D. Touslee

(57) ABSTRACT

There is described a process for producing a cover for a side airbag, which comprises first producing a polyester web, preconsolidating this web by needling and end-consolidating and fully shrinking the thus preconsolidated web by means of an embossing calender, making the thus consolidated and fully shrunk web up into a cover and providing the cover with a predetermined breaking site to tear open the cover in the event of a collision.

The process is simple to carry out and leads to inexpensive covers having improved properties.

17 Claims, No Drawings

AIRBAG COVER

This invention relates to a process for producing protective covers for side airbags.

Side airbags and protective covers are well known. While front airbags are mounted in the steering wheel of a motor vehicle to protect the driver of the vehicle in the event of an accident and corresponding airbags for the codriver or front seat passenger are mounted in the dashboard, side airbags are installed in addition to front airbags and are typically mounted in the roof region of the vehicle and are intended to protect the head and neck portions of motor vehicle occupants.

DE 100 61 367 A1 describes a side airbag cover which consists of a consolidated polyester spunbond (which does not contain any chemical bonding agent) and a predetermined breaking site to tear open the cover in the event of a collision.

Such covers are produced by initially producing a polyester web and especially a polyester spunbond, and this web is then generally preconsolidated, for example by mechanical needling or else thermally by means of a calender.

This preconsolidation is followed by the actual consolidation, and it is taught by DE 100 61 367 A1 to be preferably carried out hydrodynamically at a water pressure of 100 to 400 bar. However, consolidation by mechanical needling is also possible. This consolidation is advantageously followed by a calendering operation in which the web is allowed to shrink fully, by which the teaching of this German patent application means that the nonwoven will only shrink insignificantly, if at all, in any subsequent heat treatment.

This calendering operation is carried out using a drum calender or a cloth calender.

The polyester spunbond described there preferably has a smoothed surface of the kind, producible for example using a smooth calender.

It has been determined that covers which have been produced by means of a hydrodynamically needled web are too soft for certain applications.

It has further been determined that covers having smooth surfaces on both sides tend to crease and rustle on bending.

DE 100 09 283 C2 discloses the spot calendering of nonwovens which are to be further processed into covers for airbags which serves to spot weld the filaments together which, in the case of the web as per DE 100 09 283 C2, were obtained by splitting specific multicomponent continuous filaments having a pre-splitting linear density of 1.5 to 5 dtex. The post-splitting linear density is 0.1 to 0.2 dtex. This welding together is responsible for increasing the tenacity and the abrasion resistance of the very low-denier microfilament nonwoven.

The inventors of the DE 100 09 283 C2 patent specification believe that an airbag cover requires high tenacities and at the same time low tear strengths and therefore utilize a multicomponent microfilament nonwoven which is produced in a very costly and inconvenient process.

The low tear strength is desired so as not to hinder airbag deployment. But a low tear strength poses the risk that the explosively expanding airbag will escape not only at the predetermined breaking site but may also be able to tear open in uncontrolled fashion the openings in the protective cover through which the entire side airbag construction is secured by holding devices to the roof liner. This carries the risk that full deployment of the airbag and of its protective function is not possible in the event of an accident.

The initial complicated production of microfilament nonwovens, followed by splitting through hydrojet needling and a subsequent spot calendering operation for the purpose of adhering the filaments together all serve to make the process very complicated, which is thus not convenient to carry out and hence does not meet the requirements of a commercial process.

Even though a whole series of processes are already known for producing covers for side airbags there is still a need for improved, simpler, more economical processes leading to less costly products having good and improved properties.

It therefore is an object of the present invention to provide a process for producing covers of airbags which does not have the disadvantages of prior art processes.

It is a particular object of the present invention to provide airbag covers where the dimensional change under weather effects is reduced, which possess good fire resistance and which are easily obtainable by making up the nonwoven to airbag covers having requisite stability and stiffness. It is a further object of the present invention to provide a simpler process with which the production of protective covers of airbags is possible in a more economical manner and which leads to inexpensive products.

These objects are achieved by a process for producing a cover for a side airbag, which comprises first producing a polyester web, preconsolidating this web by needling and end-consolidating and fully shrinking the thus preconsolidated web by means of an embossing calender, making the thus consolidated and fully shrunk web up into a cover and providing the cover with a predetermined breaking site to tear open the cover in the event of a collision.

Preferably, the web is preconsolidated mechanically by needling. It is advantageous to preconsolidate by needling at a needling density of 10 to 50 stitches/cm$^2$.

A particularly useful embossing calender for consolidating and shrinking has a spot embossing profile. Preferably, this embossing calender has a spot embossing area in the range from 6 to 10%.

In a further advantageous embodiment of the invention, the embossing calender used has a rib profile. It is advantageous for this embossing calender with rib profile to have a rib embossing area in the range from 10 to 30%.

A particularly suitable polyester for making the polyester web is polyethylene terephthalate. The web is preferably produced in the form of a polyester spunbond.

It is advantageous for the web to be produced by adjusting the linear density of the polyester fibers to 1 to 6 dtex and preferably to a linear density of 1 to 4 dtex.

The preconsolidated web is preferably end-consolidated and fully shrunk at a temperature in the range from 140 to 220° C.

The polyester web used preferably has a basis weight in the range from 60 to 250 and especially from 100 to 120 g/m$^2$.

The thickness of the web after preconsolidation, consolidation and shrinking is preferably in the range from 0.2 to 2 mm and especially in the range from 0.8 to 1.2 mm.

The present invention further provides a side airbag cover produced by one of the processes recited above.

The process according to the invention may be carried out for example as follows.

First, a polyester web is produced from polyester fibers. The web can be produced from staple fibers, for example using a card.

Preferably, however, the polyester web is produced as a polyester spunbond, especially by the spunbond process. This process is described for example in DE-A 2 460 755, and produces a web composed of continuous filaments.

The filaments are laid down on a moving belt to form individual plies of filaments. This is followed by a preconsolidating operation especially by mechanical needling. However, other preconsolidating processes are possible as well, for example a hydrodynamic process employing a water pressure of 100 to 400 bar in particular.

Preconsolidation is followed by the actual consolidation or end-consolidation, in the course of which the web fully shrinks as well. This end-consolidation and full shrinking is carried out using embossing calenders, ie calenders having elevations. Particularly useful embossing calenders are embossing calenders having a spot embossing profile and embossing calenders having a rib embossing profile.

These calenders are known per se and are commercially available, for example from Kusters of Krefeld in Germany.

The temperature at which end-consolidation and full shrinking takes place is preferably in the range from 140 to 220° C. These temperatures refer to the temperature of the embossing calender.

The web, which has been compacted to a thickness of about 0.4 to 2 mm and especially to 0.8 to 1.2 mm by preconsolidation and end-consolidation and full shrinking, is then made up in a conventional manner to form a cover which has an appropriate predetermined breaking site to tear open the cover in the event of a collision.

Preferably, the polyester web from which the cover has been produced does not contain any chemical bonding agent.

It is particularly surprising that the invention provides a simple way to produce side airbag covers which are notable for good properties and which, by virtue of their economical process of production, are very inexpensive. They possess good air permeability, have a tear strength which meets automotive manufacturers' requirements, do not rustle on bending and have good delamination resistance.

The process is readily variable, so that customer wishes can be readily accommodated. For instance, the performance profile of the covers can be very efficiently controlled through choice of suitable linear densities for example in the range from 1 to 6 dtex, through choice of preconsolidation parameters, ie the needling density for example, and also through choice of calendering conditions such as temperature and embossing area.

The examples hereinbelow illustrate the invention:

EXAMPLE 1

A 120 g/m$^2$ polyester spunbond is produced by the spunbond process in 2 dtex filaments and mechanically preconsolidated by needling using 42 stitches per cm$^2$. The nonwoven thus produced is then thermally end-consolidated and fully shrunk using an embossing calender having a spot embossing profile (with an embossing area of about 8%). Web thickness is 0.8 mm and tear strength is 180 N in the machine direction and 220 N in the cross direction. The web thus produced is then made up in a conventional manner to form a cover for side airbags which is provided with an appropriate predetermined breaking site.

EXAMPLE 2

A 120 g/m$^2$ polyester spunbond composed of 2 dtex filaments is mechanically preconsolidated using 42 stitches per cm$^2$ and thermally end-consolidated and fully shrunk using an embossing calender having a rib profile (embossing area about 20%). Web thickness is 0.6 mm and tear strength is 120 N in the machine direction and 200 N in the cross direction. The web thus produced is then made up in a conventional manner to form a cover for side airbags and provided with a predetermined breaking site to tear open the cover in the event of a collision.

What is claimed is:

1. A process for producing a cover for a side airbag, which comprises first producing a polyester web, preconsolidating this web by needling and end-consolidating and fully shrinking the thus preconsolidated web by means of an embossing calender, making the thus consolidated and fully shrunk web up into a cover and providing the cover with a predetermined breaking site to tear open the cover in the event of a collision.

2. A process according to claim 1, wherein the web is preconsolidated mechanically by needling.

3. A process according to claim 2, wherein the needling density is in the range from 10 to 50 stitches/cm$^2$.

4. A process according to claim 1, wherein the consolidating is effected using an embossing calender having a spot embossing profile.

5. A process according to claim 4, wherein the embossing calender used has a spot embossing area in the range from 6 to 10%.

6. A process according claim 1, wherein the embossing calender used has a rib profile.

7. A process according to claim 6, wherein the embossing calender used has a rib embossing area in the range from 10 to 30%.

8. A process according to claim 1, wherein the polyester used is polyethylene terephthalate.

9. A process according to claim 1, wherein a polyester spunbond is used.

10. A process according to claim 1, wherein the polyester fibers used have a linear density in the,range from 1 to 6 dtex.

11. A process according to claim 10, wherein the polyester fibers used have a linear density in the range from 1 to 4 dtex.

12. A process according to claim 1, wherein the preconsolidated web is end-consolidated and fully shrunk at 140 to 220° C.

13. A process according to claim 1, wherein the polyester web has a basis weight in the range from 60 to 250 g/m$^2$.

14. A process according to claim 13, wherein the basis weight is in the range from 100 to 120 g/m$^2$.

15. A process according to claim 1, wherein the polyester web is from 0.4 to 2 mm in thickness after the preconsolidating, consolidating and shrinking steps.

16. A process according to claim 15, wherein the thickness is in the range from 0.8 to 1.2 mm.

17. A side airbag cover produced by a process as claimed in claim 1.

* * * * *